S. H. AUSTIN.
SAWING MACHINE.
APPLICATION FILED JULY 24, 1912.
1,110,736.
Patented Sept. 15, 1914.
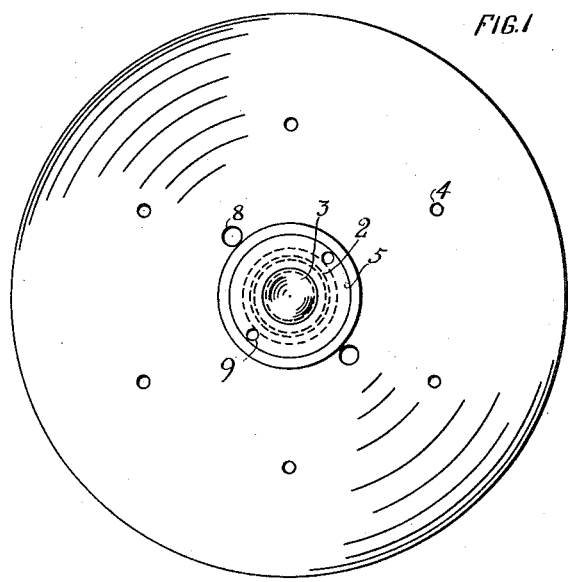
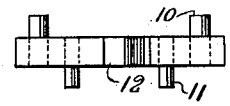
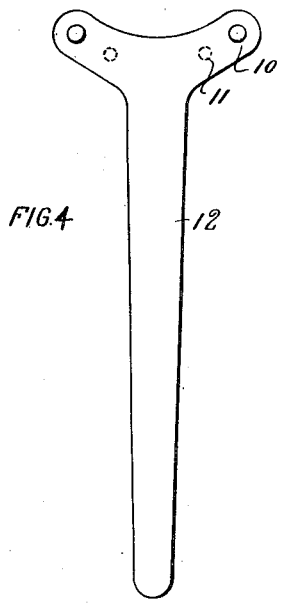
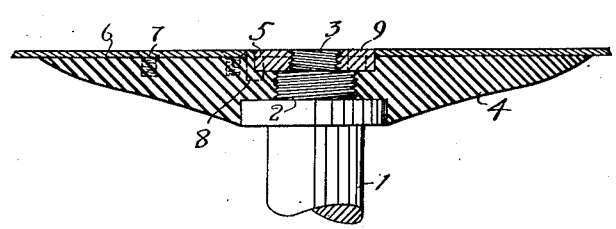
WITNESSES:
G. M. Ball.
Fritz Schafer.
INVENTOR,
Stephen H. Austin
BY Francis M. Wright,
ATTORNEY

UNITED STATES PATENT OFFICE.

STEPHEN H. AUSTIN, OF SAN FRANCISCO, CALIFORNIA.

SAWING-MACHINE.

1,110,736.

Specification of Letters Patent. Patented Sept. 15, 1914.

Application filed July 24, 1912. Serial No. 711,257.

*To all whom it may concern:*

Be it known that I, STEPHEN H. AUSTIN, a citizen of the United States, residing at San Francisco, in the county of San Francisco and State of California, have invented new and useful Improvements in Sawing-Machines, of which the following is a specification.

This invention relates to improvements in veneering machines, for cutting thin boards or veneers out of wood, and the object of the invention is to provide means for so securing the saw, that saws and collars may be quickly removed, to swage and sharpen the saw, on an automatic sharpener or otherwise, and, in the meantime, other saws and collars may be placed on the machine, so that the machine may be in almost constant use, if desired.

In the accompanying drawing, Figure 1 is a broken side view of a saw; Fig. 2 is a section through a collar carrying the saw; Fig. 3 is a top view and Fig. 4 is a side view of the spanner wrench for attaching the collar to the shaft.

Referring to the drawing, 1 indicates a mandrel formed with an inner portion 2, and a reduced outer portion 3, both of which are threaded, preferably in opposite directions, the thread upon the inner portion 2 being in a direction opposite to the cutting direction of rotation of the mandrel 1. A collar 4 is screwed upon said threaded portion 2 of the shaft, and then a circular jam nut 5 is screwed upon the reduced threaded portion 3 thereof in a recess in the collar 4 and flush with the saw 6, which is secured to the collar by screws 7.

Since the face of the saw 6 is flush with that of the jam nut and a small portion of the collar 4 between the saw and jam nut, the flitch can, in the operation of sawing, move past the saw below the center of the mandrel 1. Said collar 4 and jam nut 5 are formed respectively with recesses 8 and apertures 9, by means of which they can be respectively engaged by pins 10 extending from one side, and pins 11 extending from the other side, of a spanner wrench 12.

This arrangement permits the collar, with the saw screwed thereto, to be detached from the mandrel, and another substituted therefor with a minimum loss of time.

I claim—

In a sawing machine, a mandrel, a terminal portion of which has a threaded inner portion and a reduced oppositely threaded outer portion, a saw collar screwed on said inner portion, and having a central recess, a circular saw secured to said collar, and a jam nut in said recess and screwed on said outer portion, said mandrel, collar and jam nut being wholly on one side of the outer surface of the saw.

In testimony whereof I have hereunto set my hand in the presence of two subscribing witnesses.

STEPHEN H. AUSTIN.

Witnesses:
 F. M. WRIGHT,
 D. B. RICHARDS.